United States Patent [19]
Davlin

[11] 4,316,624
[45] Feb. 23, 1982

[54] ACCESS UNION

[76] Inventor: Irwin H. Davlin, 714 S. Court St., Opelousas, La. 70570

[21] Appl. No.: 90,461

[22] Filed: Nov. 1, 1979

[51] Int. Cl.³ .................... F16L 13/02; F16L 19/00; F16L 41/00
[52] U.S. Cl. .................................. 285/158; 285/286; 285/354
[58] Field of Search .................. 285/286, 158, 354

[56] References Cited

U.S. PATENT DOCUMENTS

| | | | |
|---|---|---|---|
| 839,090 | 12/1906 | Ayer | 285/55 X |
| 974,975 | 11/1910 | Kelly | 285/55 |
| 1,301,245 | 4/1919 | Fox | 285/286 X |
| 1,966,403 | 7/1934 | Durham | 285/286 X |
| 2,363,294 | 11/1944 | Carrier | 285/158 X |
| 2,542,583 | 2/1951 | Shea, Jr. | 285/286 X |
| 2,628,596 | 2/1953 | Bachle | 285/158 |
| 2,915,324 | 12/1959 | Jackson | 285/286 X |
| 3,062,567 | 11/1962 | De Witt | 285/286 X |
| 3,113,792 | 12/1963 | Brown | 285/354 |
| 3,516,692 | 6/1970 | Albrecht | 285/286 X |

Primary Examiner—Thomas F. Callaghan
Attorney, Agent, or Firm—L. S. Van Landingham, Jr.

[57] ABSTRACT

An access union is disclosed which is especially useful for installation on containers for fluids to permit access thereto. The invention is also concerned with containers for fluids having the access union of the invention installed thereon. When installed on containers for fluids, the access union of the invention provides for permanency of the installation when desired, and also allows future changes and modifications to be made easily and without damaging the access union and/or an access conduit or other cooperating apparatus attached thereto.

27 Claims, 21 Drawing Figures

ACCESS UNION

THE BACKGROUND OF THE INVENTION

1. The Field Of The Invention

The present invention relates to access unions which are especially adapted for installation on storage vessels, pipes and other types of containers for fluids to permit access to the interiors thereof. The invention is further concerned with the aforementioned containers for fluids having the access union of the invention installed thereon.

2. The Prior Art

Fittings of the type commonly referred to as "outlets" in this art have been used extensively heretofore to permit access to the interiors of a wide variety of different types of containers of fluids, including tanks and vessels in general wherein fluids are stored passively, and pipes and conduits in general used in the transportation, distribution and control of fluids, all of which are referred to generically herein in the specification and claims as being containers for fluids. As a general rule, the prior art outlets were usually of designs which necessitated permanent installation on the containers. As a result, the installations were inflexible, and changes or modifications could not be made easily as future needs arose without destroying the outlets, conduits and/or other apparatus permanently attached thereto.

For example, many industrial installations involve metal containers for the fluids, and metal outlets and other fixtures and associated apparatus are provided which are welded in place. Future changes and modifications cannot be made without first removing and destroying the original construction and then replacing it with new construction. This usually involves torch cutting at the time of removing the old construction, which is often followed by torch assembly of the new construction. These present practices are frequently dangerous, impractical and/or nonfunctional in actual practice in the field.

The aforementioned deficiencies and disadvantages of the prior art outlets and the resultant permanent inflexible construction have been long recognized by those skilled in this art. However, an entirely satisfactory alternative thereto was not available prior to the present invention in spite of the long existing and great need therefor.

THE SUMMARY OF THE INVENTION

The present invention overcomes the aforementioned and other disadvantages and deficiencies of the prior art. This is accomplished by providing an access union of a novel design.

In one preferred embodiment, the access union includes a first member having a longitudinally extending opening therethrough and a uniquely designed terminus on the outer end which is especially adapted to be permanently installed on the wall of a container for fluids, such as by welding around an opening which is in the flat or curved wall of a storage vessel, in the curvi-linear wall of a straight section of pipe, in the curved wall of a bend or elbow of a pipe, or in the end of a pipe. The first member is installed whereby the terminus on the outer end is in fluid tight relationship with the wall surrounding the opening in the container for fluids, and with the longitudinally extending opening in the first member being in communication with the interior of the container for fluids so as to provide access thereto. The access union also preferably includes a second member having a longitudinally extending opening therethrough which may be semi-permanently or temporarily attached to the first member. When the second member is securely attached to the first member, the terminus on the inner end of the first member and the terminus on the inner end of the second member have surfaces which cooperate to form a fluid tight seal therebetween with the longitudinal openings therein being in communication with each other and thus with the interior of the pipe or storage vessel. The outer end of the second member may be adapted to receive an access conduit, or other desired cooperating apparatus, which likewise is in communication with the longitudinal openings in the first and second members. This arrangement provides for permanency of the installation when desired, and also allows future changes and modifications to be made easily and without damaging or destroying the access union, and/or an access conduit or other cooperating apparatus attached thereto.

Reference may be had to the following detailed description of the invention and the accompanying illustrative drawings for a more thorough and complete understanding of the invention.

THE BRIEF DESCRIPTION OF THE ACCOMPANYING DRAWINGS

The invention will be described hereinafter in greater particularity with reference to the presently preferred embodiments thereof illustrated in the accompanying drawings, wherein.

THE DETAILED DESCRIPTION OF THE INVENTION INCLUDING THE PRESENTLY PREFERRED VARIANTS AND EMBODIMENTS THEREOF

Figures 1, 2, 7, 20, 21:
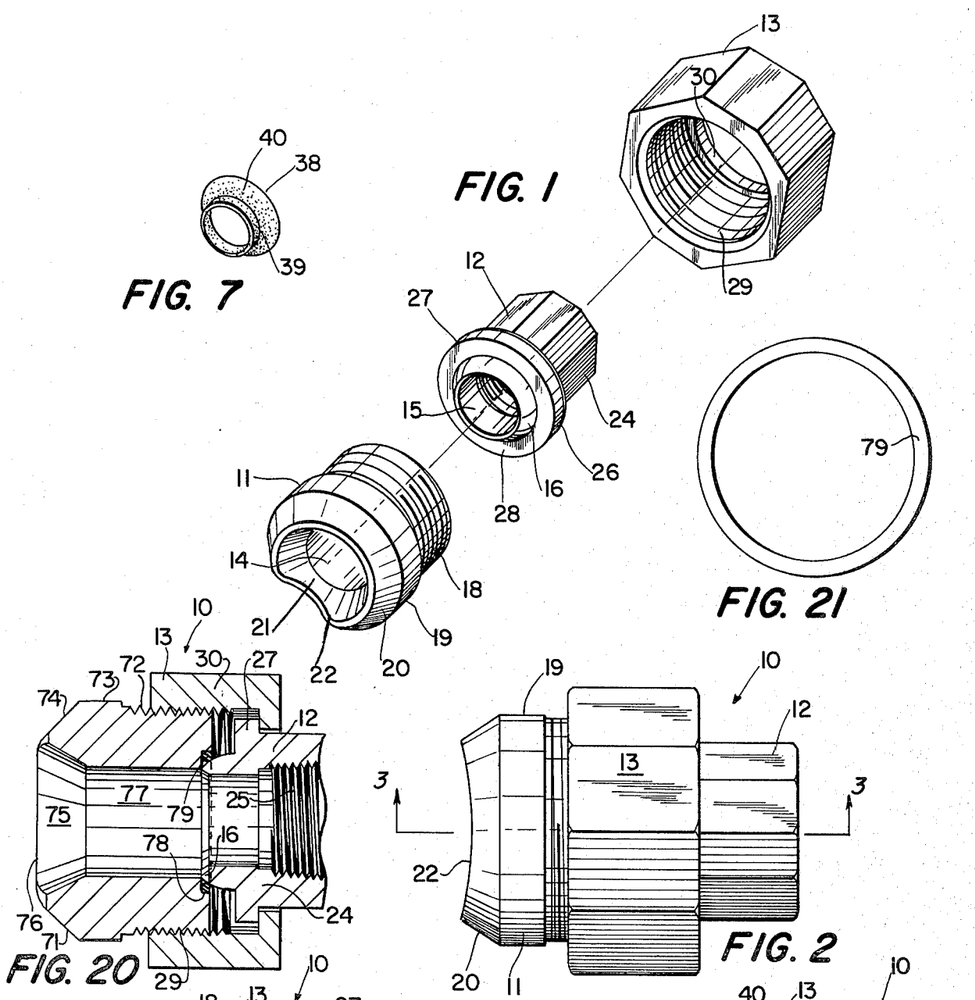
FIG. 1 is an exploded perspective view of the access union of the invention.
FIG. 2 is a side view in elevation of the assembled access union of the invention.
FIG. 7 is a perspective view of an optional insert or replacement seat which may be used in combination with the components of the access union illustrated in FIGS. 1-6.
FIG. 20 is a longitudinal cross sectional view similar to FIG. 3, but with portions thereof being broken away, which further illustrates a modified access member having the O-ring sealing member of FIG. 21 positioned therein.
FIG. 21 is a perspective view of an optional O-ring sealing member which may be used in combination with the modified access member illustrated in FIG. 20.
Figure 3:
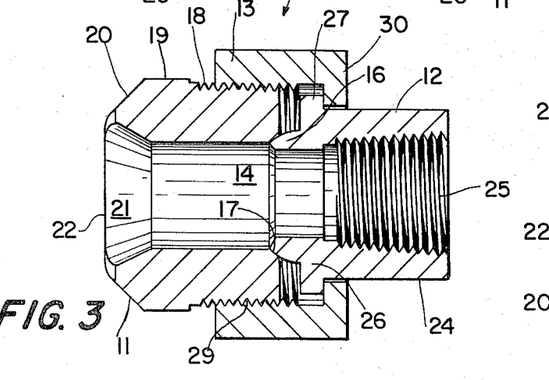
FIG. 3 is a longitudinal cross sectional view taken along the lines 3—3 of FIG. 2.

Referring now to the drawings, which illustrate presently preferred embodiments of the invention, the access union generally designated as 10 includes an access member 11, a conduit receiving member 12, and a coupling nut 13. The access member 11 and the conduit receiving member 12 have axially aligned longitudinally extending openings 14 and 15, respectively, therein which provide a passageway for fluid to flow through the access union 10. The inner end of opening 15 terminates in an annular protrusion 16, and the inner end of opening 14 terminates in an annular recess 17. As is best seen in FIG. 3, the annular protrusion 16 and the annular recess 17 constitute male and female sealing surfaces, respectively, which cooperate to form a fluid tight seal when sufficient pressure is applied axially thereto.

The inner end portion of member 11 of FIGS. 1–5 is provided with external threads 18, and the circumference of the outer end portion 19 is tapered inward to form an annular bevel 20. The outer end of the opening 14 is tapered outward toward the circumference and terminates in an annular bevel 21. As is best seen in FIG. 1, the annular bevels 20 and 21 do not meet and thus the outer end portion 19 terminates in an annular area 22 which extends transversely therebetween. The inner end of access member 11 also has a flat annular terminus 23 between the annular recess 17 and the circumference thereof.

Figure 4:
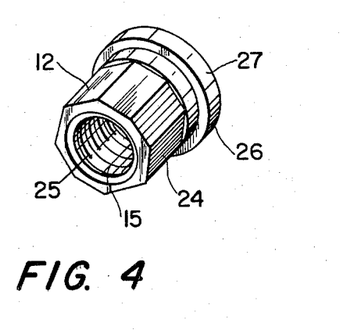
FIG. 4 is a perspective outer end view of the conduit receiving member.
Figure 5:
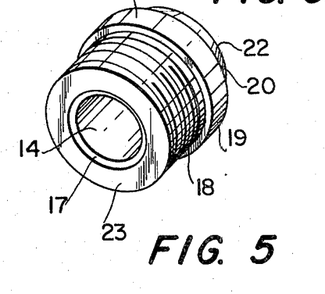
FIG. 5 is a perspective inner end view further illustrating the female annular sealing surface on the access member.

The outer end portion 24 of conduit receiving member 12 may have an octagonal or other suitably shaped surface. The opening 15 therein may be provided with suitable conduit retaining means such as internal threads 25. The inner end portion 26 may be provided with a shoulder 27 and terminates in a substantially flat annular area 28 which surrounds the annular protrusion 16.

The coupling nut 13 may have an octagonal or other suitably shaped surface and may be provided with internal threads 29. The outer end of coupling nut 13 may terminate in an unthreaded internal annular shoulder 30.

Referring now to FIGS. 2 and 3, which illustrate the assembled access union 10 of the invention, it may be seen that the conduit receiving member 12 is inserted into the opening in coupling nut 13. The outer end portion 24 extends outward from the coupling nut 13 until the external shoulder 27 rests against the internal shoulder 30. The internal threads 29 are in threaded engagement with the external threads 18 on the circumference of access member 11, and the coupling nut 13 is tightened sufficiently to urge the annular protrusion 16 into sealing engagement with annular recess 17 to thereby form a fluid tight seal. It is apparent that the access union 10 may be easily disassembled by reversing the steps of assembly, i.e., by loosening the coupling nut 13 until the threads 29 are no longer in threaded engagement with the threads 18. This allows the access member 11 to be removed, and thereafter the conduit receiving member 12 is pushed inward until it falls free of the coupling nut 13. The above described steps of assembly and disassembly may be repeated as frequently as desired as the component elements of access union 10 are very durable and sturdy in construction.

Figures 6, 10:
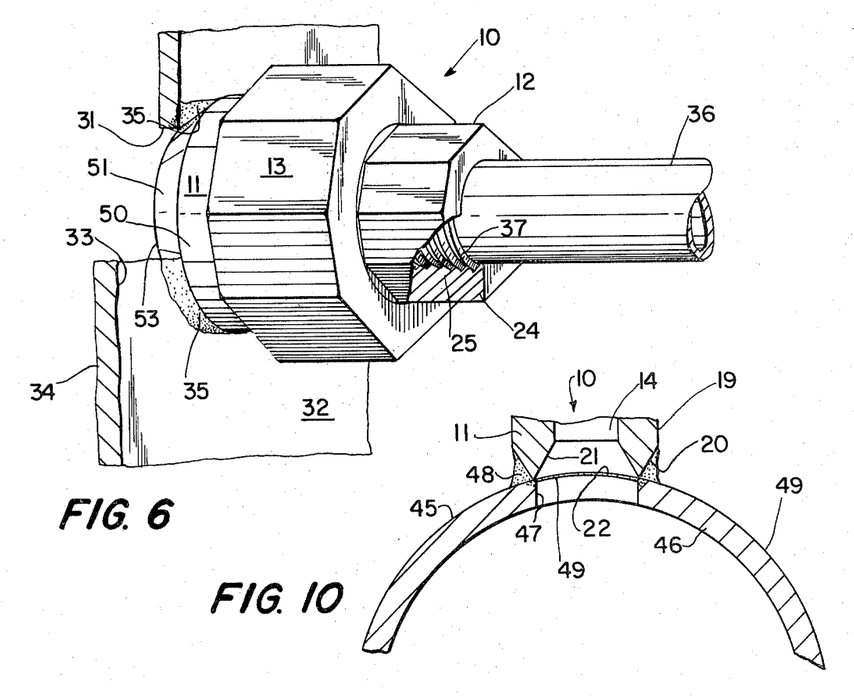
FIG. 6 is a perspective view illustrating the installation of the access union of the invention on the flat wall of a container means for fluids, and further illustrating an externally threaded conduit therein and extending outwardly therefrom.
FIG. 10 is an enlarged cross-sectional view in elevation and with portions thereof being broken away, illustrating the installation of the access union of the invention around an opening in the wall of a straight section of pipe.

FIG. 6 of the drawings illustrates the installation of the access union 10 around the annular opening 31 in the flat wall 32 of a container means for fluids. The fluid container means may be, for example, a storage tank or vessel, or any other prior art vessel means of types conventionally used for containing desired fluids. The fluids may be, for example, normally liquid substances such as water, petroleum distillates and synthetic organic compounds, or normally gaseous substances such as air, methane, ethane, carbon dioxide, helium, nitrogen, oxygen and the like. The fluids may include suspended solids to thereby form slurries or gaseous dispersions. Inasmuch as the access union 10 is extremely sturdy in construction, the fluid may be under a high pressure when desired.

The annular bevel 51 forms a convenient welding throat when placed in position on the outer surface 33 and around the circumference of annular opening 31. When so positioned, the access union 10 as shown in FIG. 6 may be permanently welded to the wall 32 without any difficulty. The bead of weld metal 35 assures a fluid tight seal between the access member 11 and the wall 32 in the vicinity of the opening 31. The access member 11 is thereby permanently attached to the wall 32 with the opening 14 being in communication with the internal wall surface 34 and the interior of the vessel means. However, it is still possible to disassemble the access union 10 by loosening the coupling nut 13 until the internal threads 29 thereof are no longer in threaded engagement with the external threads 18. Thereafter, the conduit receiving member 12, the conduit 36 having extenal threads 37 in fluid tight threaded engagement with the internal threads 25, and the coupling nut 13 may be separated from the access member 11. When desired, the conduit receiving member 12 may be removed from conduit 36 by turning in a direction to remove the internal threads 25 from threaded engagement with the external threads 37. The access member 12 may thereafter be removed from the coupling nut 13 by pushing inward on the outer end portion 24 until it falls free of coupling nut 13. The described steps of disassembling the apparatus, and these steps in reverse order in assembling the apparatus, may be repeated thereby allowing the conduit 36 to be opened, removed and/or replaced whenever desired, without requiring destructive methods such as by severing or otherwise destroying the conduit 36 and/or access union 10.

Figure 9:
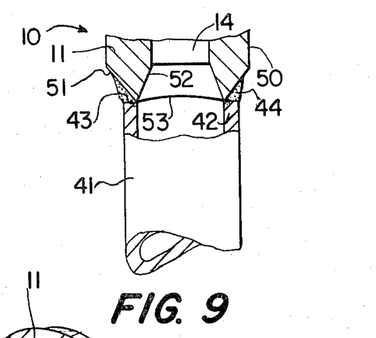
FIG. 9 is a view in elevation, partially in cross section and with portions thereof being broken away, illustrating the installation of the access union of the invention around the opening in the end of a pipe.

FIG. 9 of the drawings illustrates the installation of the access union 10 in the open end 43 of pipe 41. The annular bevel 51 forms a convenient welding throat when placed in position on the outer end 43 and against the end of annular pipe wall 42. When so positioned, the access union 10 may be permanently welded to the wall 42 without any difficulty. The bead of weld metal 44 assures that a fluid tight seal is formed between the access member 11 and the pipe wall 42 in the vicinity of the opening in the end 43. The access member 11 is thereby permanently attached to the wall 42 with the opening 14 being in communication with the interior of the pipe 41. However, it is still possible to assemble and disassemble the access union 10 following the same general procedure as discussed above for FIG. 6.

Figure 8:
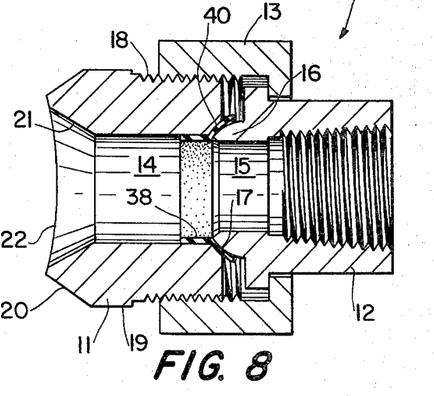
FIG. 8 is a longitudinal cross sectional view similar to FIG. 3, but taken 90° to the lines 3—3 of FIG. 2, illustrating the insert or replacement seat of FIG. 7 positioned in the assembled access union.
Figure 11:
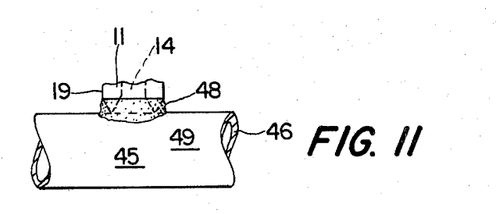
FIG. 11 is a side view in elevation of the section of pipe of FIG. 10.

FIGS. 10 and 11 illustrate the installation of the access union 10 around the annular opening 47 in the curvi-linear wall or cylindrical wall 46 of a pipe or cylindrical storage vessel 45. As is best seen in FIGS. 1, 2 and 8, the terminus or outer end 19 is a compound curve and thus the curvature of the annular terminus 22 conforms closely with the curvature of the outer surface 49 of wall 46 thereby allowing the access member 11 to be easily mounted thereon. When so mounted, the annular terminus 22 and the annular bevel 20 may be permanently welded to the wall 46 without any difficulty. The bead of weld metal 48 assures that a fluid-tight seal is formed between the access member 11 and the wall 46 in the vicinity of the opening 47. The access member 11 is thereby permanently attached to the wall 46 with the opening 14 being in communication with the interior of the pipe or cylindrical tank 45. However, it is still possible to assemble and disassemble the access union 10 following the procedure discussed previously in connection with FIG. 6.

FIG. 7 of the drawings illustrates an optional insert 38. The insert 38 incudes a generally cylindrical portion 39 which has an external diameter allowing it to be easily inserted into opening 14 in a close fitting relationship, and an annular outwardly flared portion 40 which conforms with the surface of the recess 17. As is best seen in FIG. 8, when the cylindrical portion 39 is positioned in opening 14, the annular protrusion 16 is forced against the flared portion 40 upon tightening the coupling nut 13, thereby forming a fluid-tight seal between the surfaces of the annular protrusion 16, the flared portion 40, and the annular recess 17. This increases the effective life of the access union 10 as a fluid tight seal may be formed when a fresh insert 38 is present and the nut 13 is tightened even when the annular protrusion 16 and/or the annular recess 17 are worn, scarred, or otherwise do not conform to form a fluidtight seal. Also, in instances where dissimilar metals are used which present a corrosion problem, the metal employed in the insert 38 is compatible with the two dissimilar metals. Thus, the insert 38 may be of brass, steel, stainless steel, and the like, and the composition is selected so as to be compatible with the metal or metals which are present.

Figure 12:
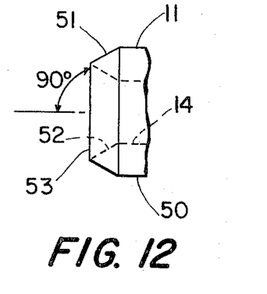
FIG. 12 is a fragmentary side view in elevation illustrating a modified configuration for the outer end of the access member of FIG. 1.
Figure 13:
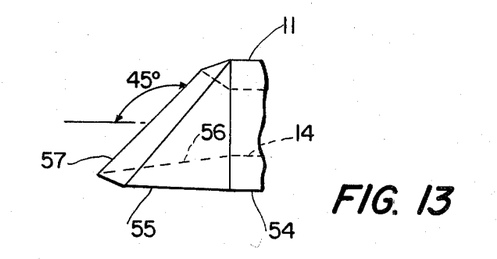
FIGS. 13 and 14 are fragmentary side views in elevation illustrating further modified configurations for the outer end of the access member of FIG. 1.
Figure 14:
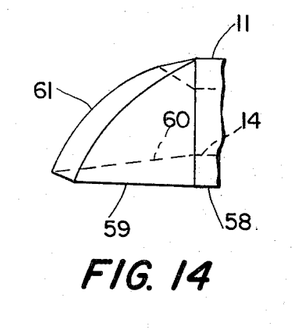

FIGS. 1–5, 8, 10 and 11 of the drawings illustrate one presently preferred embodiment of the access union 10, including the access member 11 having an outer end 19, the inward bevel 20, the outward bevel 21 and the annular terminus 22. The annular terminus 22 is contoured along a compound curve and has a configuration which conforms substantially with the contour around the opening 47 in the curved external wall 46, whereby the access member 10 may be mounted on the curved outer external wall surface 49 and permanently installed thereon at substantially 90 degrees thereto as illustrated in FIGS. 10 and 11. FIGS. 12, 13 and 14 illustrate modified forms for the aforementioned outer end 19, internal bevel 20, outward bevel 21 and annular terminus 22. It is understood that the remainder of the access member 11 and access union 10, and the operation and use thereof, are identical with the previous description, and thus are not further described herein in order to avoid unnecessary repetition.

FIG. 12 is a fragmentary view illustrating a modified outer end 50 of access member 11 having an inward bevel 51, an outward bevel 52 and an annular terminus 53. It may be noted that the annular terminus 53 is substantially flat and a plane taken therethrough intersects the longitudinal axis of the access member 10 at substantially 90 degrees. Thus, the annular terminus 53 has a configuration which conforms substantially with the contour around an opening in a flat external wall surface of a container for fluids, whereby the access member 10 may be mounted around the opening in a flat extenal wall surface or on the end of a pipe and permanently installed thereon. This is illustrated in FIGS. 6 and 9 of the drawings.

Figure 15:
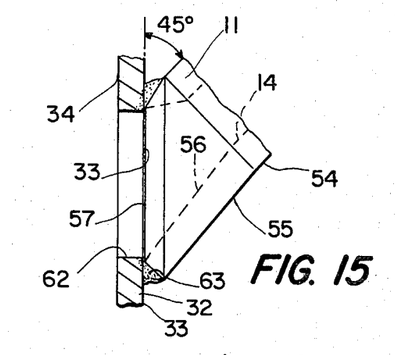
FIG. 15 is a fragmentary side view in elevation and partially in cross section, illustrating the access member of FIG. 13 installed at an angle around an opening in the flat wall of a container for fluids.

FIG. 13 is a fragmentary view illustrating a further modified outer end 54 of access member 11 having an inward bevel 55, an outward bevel 56 and an annular terminus 57. It may be noted that the annular terminus 57 is flat, and that a plane passing generally through the outer terminus 57 forms an acute angle with the longitudinal axis of the access union 10, such as 45 degrees. As is best seen in FIG. 15, the annular terminus 57 has a configuration which conforms substantially with the contour of the substantially flat wall 32 around the opening 62. Thus, an access union 10 including annular terminus 57 may be angularly mounted on the flat surface 33 around the opening 62 and permanently installed thereon in fluid tight relationship, such as by means of welding bead 63. FIG. 14 is a fragmentary view illustrating a further modified outer end 58 of an access member 11 having an inward bevel 59 and outward bevel 60 and an annular terminus 61. The annular terminus 61 is contoured along a compound curve, and in this respect is somewhat similar to annular terminus 22. However, it may be noted that a plane taken generally through the annular terminus 61 intersects the longitudinal axis of the access member 10 at an acute angle, such as 45 degrees. The annular terminus 61 has a configuration which conforms substantially with the contour around an opening in a container for fluids having a curved surface, such as is illustrated in FIGS. 16, 17, 18 and 19 of the drawings. Thus, an access member 10 including annular terminus 61 may be angularly mounted on a curved surface of a container for fluids.

Figure 16:
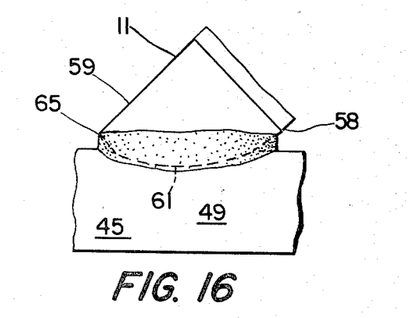
FIG. 16 is a fragmentary side view in elevation illustrating an access member similar to that of FIG. 14 installed at an angle around an opening in a straight section of pipe.
Figure 17:
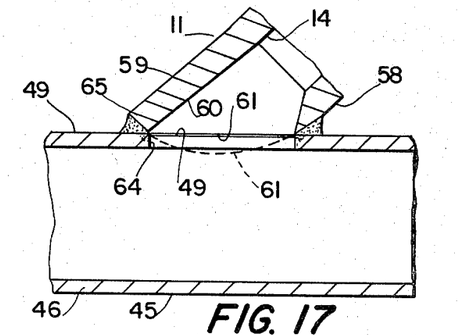
FIG. 17 is a longitudinal cross sectional view of FIG. 16.

FIGS. 16 and 17 are fragmentary views which illustrate an access union 10 including annular terminus 61 installed on a section of pipe 45 having an opening 64 in wall 46. It may be noted that the annular terminus 61 is angularly positioned on the curved outer surface 49 around the opening 64 and is permanently attached to wall 46 in fluid tight relationship by means of the weld bead 65. The surface of the annular terminus 61 has a configuration which conforms with the outer surface 49 around the opening 64, and thus the access member 11 may be mounted thereon without any difficulty. The mounted access union 10 extends outward from the wall surface 49 at an acute angle, such as 45 degrees.

Figure 18:
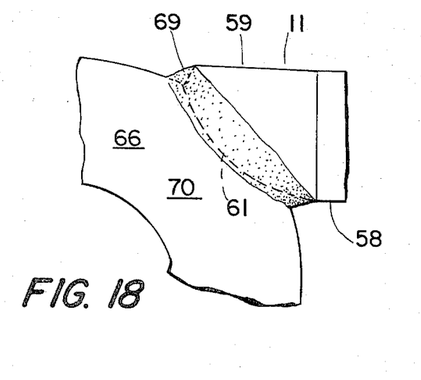
FIG. 18 is a fragmentary side view in elevation illustrating an access member similar to that of FIG. 14 installed at an angle around an opening in a bend or elbow of a pipe.
Figure 19:
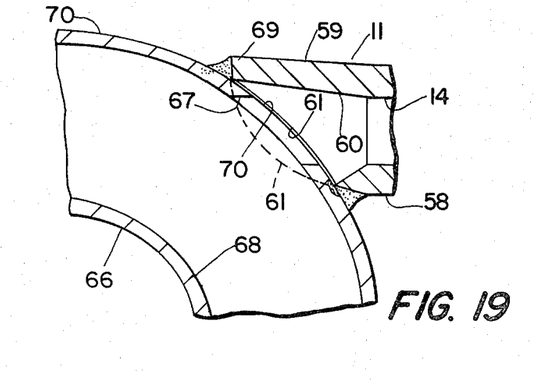
FIG. 19 is a cross sectional view of FIG. 18.

FIGS. 18 and 19 are fragmentary views illustrating an access union 10 including annular terminus 61 angularly mounted on the outer surface 70 of a 90 degree elbow 66. The elbow 66 has an opening 67 in the wall 68 thereof, and the annular terminus 61 has a configuration which conforms with the outer surface 70 around the opening 67. Thus, an access member 11 including annular terminus 61 may be easily positioned on the surface 70 as it closely conforms thereto, and then permanently attached to the wall 68 in fluid tight relationship by means of welding bead 69.

The opening in the wall of a container which permits access thereto may be made either before or after installing the access union 10. For instance, as is illustrated in FIG. 17, the opening 64 may be made prior to installing the access union 10. However, as is illustrated in FIG. 19, it is possible to first install the access member 11 by welding, and then insert a drill through opening 14 and drill an opening 67 in wall 68. Thereafter, the remaining components of the access union 10 are assembled and disassembled as discussed previously.

The external threads 18 and the internal threads 39 in coupling nut 13 are preferably, but not necessarily, of the V or Acme (straight) design. Thus, the coupling nut 13 may be tightened as much as desired to thereby apply sufficient pressure to force the annular protrusion 16 into a fluid-tight sealing relationship with annular recess 17, or when the insert 38 is in place as illustrated in FIG. 8, to force the annular protrusion 16 against the insert 38 and apply sufficient pressure thereto to form a fluid-tight seal between the surfaces of protrusion 16, the insert 38 and the annular recess 17.

FIG. 20 illustrates a modified access member 71 which is similar to access member 11 with the exception of providing an annular machined slot 78 on its inner end portion for receiving the O-ring 79 illustrated in FIG. 21. The slot 78 and O-ring 79 extend around the opening 77, and are arranged whereby the annular protrusion 16 is forced against the O-ring 79 in sealing relationship upon tightening the coupling nut 13. The O-ring 79 may be formed of butyl rubber or other suitable resilient materials which are commonly used for the manufacture of O-ring sealing members.

The access member 71 has an outer end portion 73 and may be provided with external threads 72, an opening 77, an inward bevel 74, and outward bevel 75 and an annular area 76 which are similar to those previously discussed for access member 11. Also, the conduit receiving member 12, the coupling nut 13, and the various component parts thereof are as previously discussed for access union 10. The general use of access member 71 in the access union 10 is the same as previously discussed for access member 11, with the specific exceptions noted hereinbefore arising from the use of the O-ring sealing member 79.

While the annular protrusion 16 and annular recess 17 are presently preferred as pressure sealing surfaces for forming a fluid-tight seal, it is understood that other suitable prior art types of angled seats or sealing surfaces suitable for pressure sealing may be used. Additionally, while the coupling nut 13 carried by access member 11 and the conduit receiving member 12 is presently preferred as the means for applying pressure to the sealing surfaces, it is understood that other suitable prior art types of pressure applying means may be employed for this purpose. Similarly, while welding is the preferred method of attaching the access member 11, it is understood that other suitable means conventional in the art may be employed. The internal threads 25 in the conduit receiving member 11 may be, but are not necessarily, pipe threads. Alternatively, the threads 25 may be omitted when desired and an equivalent means for attaching a conduit thereto may be employed, such as a conventional socket or butt weld fitting for receiving a conduit or other equivalent means such as a male threaded member. The conduit receiving member 12 also may be replaced by other apparatus which is desired to be in communication with the interior of the container for fluids, such as thermowell connections, or by pipe support and hanger connections which need not necessarily be in communication with the interior.

The term container(s) for fluids, as used in the present application and claims, is intended to include tanks and vessels in general wherein fluids are stored passively, and pipes and conduits in general used in the transportation, distribution and control of fluids. Thus, the term is used generically in the specification and claims. Also, the term access union as used in the specification and claims is intended to be generic in scope, and to include unions commonly referred to in this art as outlet unions, as well as unions which may be more properly described as inlet unions.

The containers for fluids and the components of the access union are usually constructed of metal. However, it is understood that suitable plastics may be used when desired. Examples of metals include steel, stainless steel, brass, copper, aluminum, and alloys commonly used in this art such as monel nickel, cupro-nickel, inconel, incoloy and hastelloy. Examples of plastics include polyethylene, polypropylene, ABS copolymers, and the like. The fluids which may be stored in the aforementioned containers include those previously discussed in connection with FIG. 6 and it is understood that the fluids may be under high pressure when desired. Slurries and gaseous dispersions are also intended to be embraced by the term fluids.

The foregoing detailed description and the accompanying drawings are for purposes of illustration only, and are not intended as being limiting to the spirit or scope of the appended claims.

I claim:

1. An access union comprising a weldable short axially extending access member having inner and outer termini, the access member having a non-internally threaded axially extending opening extending between the said outer terminus thereof and the said inner terminus thereof to thereby provide a passageway for fluid to flow longitudinally therethrough, a short axially extending conduit receiving member having inner and outer termini, the conduit receiving member having an axially extending opening extending between the said inner terminus thereof and the said outer terminus thereof to thereby provide a passageway for fluid to flow longitudinally therethrough, the said openings in the access member and conduit receiving member having approximately the same internal diameters, the outside diameter of the access member being generally larger than the outside diameter of the conduit receiving member and the access member being relatively uniformly thick walled and the conduit receiving member being relatively thin walled along most of its length, the said inner terminus of the access member including first pressure sealing means around the said opening therein, the said inner terminus of the conduit receiving member including second pressure sealing means around the said opening therein, the said first and second pressure sealing means cooperating to form a fluid tight seal therebetween with the opening in the conduit receiving member being in communication with the opening in the access member when force is applied to the access member and conduit receiving member longitudinally in directions toward their respective inner termini, detachable means carried by the access member and the conduit receiving member for releasably applying force thereto longitudinally in directions toward their respective inner termini, the said detachable force applying means being adapted to be mounted in an effective force applying relationship on the relatively large outside diameter outer surface of the access member and the relatively small outside diameter outer surface of the conduit receiving member, the said first and second pressure sealing means being urged into a fluid tight sealing relationship and the opening in the conduit receiving member being in communication with the opening in the access member when the said detachable force applying means is carried by the access member and the conduit receiving member and the said force is applied thereto, the said first and second pressure sealing means being rendered ineffective to form a fluid tight seal therebetween and the opening in the conduit receiving member being out of assured communication with the opening in the access member when the said detachable force applying means is no longer carried by the access member and the conduit receiving member and the said force is no longer applied thereto, the access member including means adjacent the outer terminus thereof for adapting it to be permanently installed by welding around an opening in the wall of a container for fluids with the said opening in the access member being in communication with the interior of the said container for fluids to thereby provide access thereto, the said adapting means on the access member including an annular welding bevel around the said opening in the outer terminus thereof, the welding bevel being tapered toward the outer terminus of the access member and inward toward the outer terminus of the said opening therein and terminating adjacent the outer terminus of the said opening therein, the outer terminus of the access member having a configuration which substantially conforms with the contour of the said wall of the container for fluids to thereby aid in permanently installing the access member thereon by welding along the said welding bevel, and the conduit receiving member including means adjacent the outer terminus thereof for attaching a conduit for fluid thereto whereby the interior of the said conduit is in communication successively with the said opening in the conduit receiving member and the said opening in the access member.

2. The access union of claim 1 wherein the said first pressure sealing means comprises an angled seat and the said second pressure sealing means comprises an angled seat which is complimentary thereto.

3. The access union of claim 1 wherein the access member is externally threaded, the conduit receiving member has an external shoulder thereon, and the said detachable force applying means is a coupling nut having inner and outer end portions, the couping nut having an internal shoulder adjacent the outer end portion for receiving the said external shoulder on the conduit receiving member and internal threads on the inner end portion for threaded engagement with the said external threads on the access member whereby the coupling nut may be tightened and the said force thereby applied to the access member and conduit receiving member.

4. The access union of claim 3 wherein the said external and internal threads are of "V" or Acme design whereby as much force as desired may be applied to the access member and the conduit receiving member.

5. The access union of claim 1 wherein the outer terminus of the access member is substantially flat and has a configuration which conforms substantially with the contour around an opening in a flat external wall surface of a container for fluids whereby the access member may be mounted around the said opening in the flat external wall surface and permanently installed thereon.

6. The access union of claim 5 wherein a plane passing generally through the outer terminus of the access member forms an acute angle with the longitudinal axis of the access union whereby the access union may be angularly installed on the wall of a container for fluids.

7. The access union of claim 1 wherein the outer terminus of the access member is contoured along a compound curve and has a configuration which conforms substantially with the contour around an opening in a curved external wall surface of an annular container for fluids whereby the access member may be mounted around the said opening in the curved external wall surface and permanently installed thereon.

8. The access union of claim 7 wherein a plane passing generally through the outer terminus of the access member forms an acute angle with the longitudinal axis of the access union whereby the access union may be angularly installed on the wall of a container for fluids.

9. The access union of claim 1 wherein the access member is externally threaded, the conduit receiving member has an external shoulder thereon, and the said detachable force applying means is a coupling nut having inner and outer end portions, the coupling nut having an internal shoulder adjacent the outer end portion for receiving the said external shoulder on the conduit receiving member and internal threads on the inner end portion for threaded engagement with the said external threads on the access member whereby the coupling nut may be tightened and the said force thereby applied to the access member and conduit receiving member.

10. The access union of claim 1 wherein the said first pressure sealing means comprises an annular slot means for receiving an O-ring formed in the said inner terminus of the access member and extending around the said opening therein, an O-ring sealing member formed of a resilient material is positioned in the said slot means, the said second pressure sealing means includes an annular protrusion extending around the said opening in the inner terminus of the conduit receiving member and outward therefrom, and the said O-ring sealing member and the said annular protrusion co-operating to form a fluid tight seal therebetween with the opening in the access member being in communication with the opening in the conduit receiving member when force is applied to the access member and conduit receiving member longitudinally in directions toward their respective inner termini.

11. The access union of claim 1 wherein an annular insert means is provided, the insert means including a longitudinally extending generally tubular portion having an annular flange extending outward therefrom at one end, the tubular portion being of a size and shape to be received by the said opening in the access member or the conduit receiving member, and the said annular flange being positioned between the said first and second pressure sealing means and cooperating therewith to form a fluid tight seal therebetween with the opening in the conduit receiving member being in communication with the opening in the access member when force is applied to the access member and conduit receiving member longitudinally in directions toward their respective inner termini.

12. In a container for fluids including wall means having interior and exterior surface means, the said interior and exterior surface means defining the interior and exterior of the container for fluids respectively, the wall means having an opening therethrough which permits communication between the said interior and exterior surface means, the improvement which comprises an access union installed on the said exterior surface means around the said opening in the wall means to thereby provide access to the said interior of the container for fluids, the access union comprising a weldable short axially extending access member having inner and outer termini, the access member having a non-internally threaded axially extending opening extending between the said outer terminus thereof and the said inner terminus thereof to thereby provide a passageway for fluid to flow longitudinally therethrough, a short axially extending conduit receiving member having inner and outer termini, the conduit receiving member having an axially extending opening extending between the said inner terminus thereof and the said outer terminus thereof to thereby provide a passageway for fluid to flow longitudinally therethrough, the said openings in the access member and conduit receiving member having approximately the same internal diameters, the outside diameter of the access member being generally larger than the outside diameter of the conduit receiving member and the access member being relatively uniformly thick walled and the conduit receiving member being relatively thin walled along most of its length, the said inner terminus of the access member including first pressure sealing means around the said opening therein, the said inner terminus of the conduit receiving member including second pressure sealing means around the said opening therein, the said first and second pressure sealing means cooperating to form a fluid tight seal therebetween with the opening in the conduit receiving member being in communication with the opening in the access member when force is applied to the access member and conduit receiving member longitudinally in directions toward their respective inner termini, detachable means carried by the access member and the conduit receiving member for releasably applying force thereto longitudinally in directions toward their respective inner termini, the said detachable force applying means being adapted to be mounted in an effective force applying relationship on the relatively large outside diameter outer surface of the access member and the relatively small outside diameter outer surface of the conduit receiving member, the said first and second pressure sealing means being urged into a fluid tight sealing relationship and the opening in the conduit receiving member being in communication with the opening in the access member when the said detachable force applying means is carried by the access member and the conduit receiving member and the said force is applied thereto, the said first and second pressure sealing means being rendered ineffective to form a fluid tight seal therebetween and the opening in the conduit receiving member being out of assured communication with the opening in the access member when the said detachable force applying means is no longer carried by the access member and the conduit receiving member and the said force is no longer applied thereto, the access member including means adjacent the outer terminus thereof for adapting it to be permanently installed by welding on the said exterior surface means around the said opening in the wall means with the said opening in the access member being in communication with the said interior surface means to thereby provide access to the interior of the container for fluids, the said adapting means on the access member including an annular welding bevel around the said opening in the outer terminus thereof, the welding bevel being tapered toward the outer terminus of the access member and inward toward the outer terminus of the said opening therewith and terminating adjacent the outer terminus of the said opening therein, the outer terminus of the access member having a configuration which substantially conforms with the contour of the said wall of the container for fluids to thereby aid in permanently installing the access member thereon by welding along the said welding bevel, and the conduit receiving member including means adjacent the outer terminus thereof for attaching a conduit for fluid thereto whereby the interior of the said conduit is in communication successively with the said opening in the conduit receiving member and the said opening in the access member.

13. The container of claim 12 wherein the said first pressure sealing means comprises an angled seat and the said second pressure sealing means comprises an angled seat which is complimentary thereto.

14. The container of claim 12 wherein the access member is externally threaded, the conduit receiving member has an external shoulder thereon, and the said detachable force applying means is a coupling nut having inner and outer end portions, the coupling nut having an internal shoulder adjacent the outer end portion for receiving the said external shoulder on the conduit receiving member and internal threads on the inner end portion for threaded engagement with the said external threads on the access member whereby the coupling nut may be tightened and the said force thereby applied to the access member and conduit receiving member.

15. The container of claim 14 wherein the said external and internal threads are of "V" or Acme design whereby as much force as desired may be applied to the access member and the conduit receiving member.

16. The container of claim 12 wherein the access member is externally threaded, the conduit receiving member has an external shoulder thereon, and the said detachable force applying means is a coupling nut having inner and outer end portions, the coupling nut having an internal shoulder adjacent the outer end portion for receiving the said external shoulder on the conduit receiving member and internal threads on the inner end portion for threaded engagement with the said external threads on the access member whereby the coupling nut may be tightened and the said force thereby applied to the access member and conduit receiving member.

17. The container of claim 16 wherein the said external and internal threads are of "V" or Acme design whereby as much force as desired may be applied to the access member and the conduit receiving member.

18. The container of claim 12 wherein the said exterior surface means around the said opening in the wall means is substantially flat and the outer terminus of the access member is substantially flat and has a configuration which conforms substantially therewith whereby the access member may be mounted around the said opening in the wall means and permanently installed thereon by welding.

19. The container of claim 18 wherein the access union is installed on the terminal end of a pipe cut at approximately 90 degrees on the longitudinal axis.

20. The container of claim 18 wherein the access union is installed on the substantially flat wall of a container for fluids.

21. The container of claim 18 wherein a plane passing generally through the outer terminus of the access member forms an acute angle with the longitudinal axis of the access union whereby the access union may be angularly installed on the said exterior surface means.

22. The container of claim 21 wherein the access union is angularly installed on the substantially flat wall of a container for fluids.

23. The container of claim 12 wherein the said exterior surface means around the said opening in the wall means is curved and the outer terminus of the access member is contoured along a compound curve and has a configuration which conforms substantially therewith whereby the access member may be mounted around the said opening in the wall means and permanently installed thereon by welding.

24. The container of claim 23 wherein the access union is installed on the curved exterior surface of a bend or elbow in a pipe.

25. The container of claim 23 wherein the access union is installed on the exterior curvi-linear surface of a pipe.

26. The container of claim 23 wherein a plane passing generally through the outer terminus of the access member forms an acute angle with the longitudinal axis of the access union whereby the access union may be angularly installed on the said exterior surface means.

27. The container of claim 26 wherein the access union is angularly installed on the exterior curvi-linear surface of a pipe.

* * * * *